(12) United States Patent  
Capobianco et al.

(10) Patent No.: US 9,344,601 B2
(45) Date of Patent: May 17, 2016

(54) METHOD AND SYSTEM FOR ANTIFORGERY MARKING OF PRINTED DOCUMENTS

(71) Applicant: VIDITRUST S.R.L., Siena (IT)

(72) Inventors: Luca Capobianco, Siena (IT); Giacomo Cancelli, Siena (IT); Mauro Barni, Prato (IT)

(73) Assignee: VIDITRUST S.R.L., Siena (IT)

( * ) Notice: Subject to any disclaimer, the term of this patent is extended or adjusted under 35 U.S.C. 154(b) by 0 days.

(21) Appl. No.: 14/347,283

(22) PCT Filed: Sep. 26, 2012

(86) PCT No.: PCT/IT2012/000295
§ 371 (c)(1),
(2) Date: Mar. 26, 2014

(87) PCT Pub. No.: WO2013/046240
PCT Pub. Date: Apr. 4, 2013

(65) Prior Publication Data
US 2014/0285855 A1  Sep. 25, 2014

(30) Foreign Application Priority Data

Sep. 27, 2011  (IT) .............................. FI2011A0207

(51) Int. Cl.
*H04N 1/32* (2006.01)
*B41M 3/14* (2006.01)
*G07D 7/00* (2016.01)
*G06T 1/00* (2006.01)

(52) U.S. Cl.
CPC ............. *H04N 1/32352* (2013.01); *B41M 3/14* (2013.01); *G06T 1/0071* (2013.01); *G07D 7/00* (2013.01); *H04N 1/32267* (2013.01); *G06T 2201/0064* (2013.01)

(58) Field of Classification Search
CPC ............... B41M 3/14; G06T 1/0071; G06T 2201/0064; G07D 7/00; H04N 1/32267
See application file for complete search history.

(56) References Cited

U.S. PATENT DOCUMENTS

| | | | |
|---|---|---|---|
| 6,973,196 B2 * | 12/2005 | Patton | G07D 7/004 340/5.86 |
| 6,973,198 B2 | 12/2005 | Patton et al. | |
| 7,333,629 B2 | 2/2008 | Patton et al. | |
| 8,055,064 B2 | 11/2011 | Kiuchi et al. | |

(Continued)

FOREIGN PATENT DOCUMENTS

| | | |
|---|---|---|
| EP | 1 286 315 | 2/2003 |
| EP | 1 864 825 | 12/2007 |

OTHER PUBLICATIONS

International Search Report dated Feb. 26, 2013, corresponding to PCT/IT2012/000295.

*Primary Examiner* — Quang N Vo
(74) *Attorney, Agent, or Firm* — Young & Thompson

(57) ABSTRACT

Method for antiforgery marking and authentication of printed products, includes the following steps: printing sample prints with a given printer of an image that is to be associated to a product (P); digitally acquiring the prints, to obtain digital images; processing the images acquired for extracting therefrom one or more intrinsic characteristics identifying the printer used; and incorporating in the printed product (P) an identification marking containing information associated to the printed product and to the characteristics identifying the printer and a print of the image.

12 Claims, 9 Drawing Sheets

(56) References Cited

U.S. PATENT DOCUMENTS

| | | |
|---|---|---|
| 2001/0037455 A1 | 11/2001 | Lawandy et al. |
| 2003/0035148 A1 | 2/2003 | Patton et al. |
| 2006/0008115 A1 | 1/2006 | Patton et al. |
| 2006/0008309 A1 | 1/2006 | Patton et al. |
| 2006/0126094 A1* | 6/2006 | Haas ................ G07D 7/004 358/1.14 |
| 2009/0128858 A1 | 5/2009 | Kiuchi et al. |

* cited by examiner

METHOD AND SYSTEM FOR ANTIFORGERY MARKING OF PRINTED DOCUMENTS

TECHNICAL SECTOR OF THE INVENTION

The invention relates to a method for antiforgery marking and authentication of printed products.

The term "forgery" is generally used in a wide sense and comprises any production of a product that imitates the appearance of an original product so as to induce a consumer into error.

Described in the present specification is an antiforgery method and apparatus for traceability of printed products. More in particular, the invention regards a system for rendering a printed product non-riproducible, thus preventing unauthorized reproduction thereof: in this way, it is possible to protect the printed product itself, for example in the case where this bears sensitive information (for example, certificates), or else protect products and product packages incorporating a printed item (for example, labels, packaging, stickers, etc.).

PRIOR ART

In the current state of the art, the phenomenon of forgery of products is a problem that continues to increase and hits transversely all sectors of production, and for its very nature shifts the equilibrium of the markets and affects competition with extremely high costs due both to the loss of earnings and to the loss of image of the manufacturer of the product itself, caused by the poorer quality of the goods present on the market.

To tackle this problem companies invest considerable amounts of capital in the protection of their own rights and in technologies for countering forgery. Many technologies are available, amongst which there is a widespread use of optical and electronic technologies, RFID technologies, techniques of electronic marking or "information hiding", holographic techniques and 2D barcodes, techniques of chemical or mechanical marking, and the like.

From the document No. US2006126094 a system is known for printing an original image that is to be protected against imitation or modification.

The image includes a characteristic of the printer to be used for detecting the copy and encoded information correlated to the characteristic of the printer: in the verification step, the image is examined to determine whether the connection between the characteristic of the printer and the encoded information is effectively reproduced.

However, in US2006126094 the characteristic of the printer is not obtained intrinsically from the effective behaviour thereof, but is set on the basis of the prior knowledge of the printer used: in other words, there is known beforehand pre-set information that is entered by the system in hidden mode and analyzed in the verification step to check integrity thereof. Moreover, in the verification step, this information must necessarily be extracted using a predetermined image-acquisition device, in the absence of which the verification test cannot be carried out.

From the document No. EP1286315 a method is known for authenticating printed items, which generates and controls (induces) variations of the characteristics of the print. Said method envisages, in fact, introduction, via modification of printing parameters (such as, for example, the temperature), of a "recognizable trace". In this way, a sort of signature is inserted, that can be extracted at a subsequent moment, said signature marking each individual printed item one by one.

Before the "recognizable trace" has been deposited on the item, it must be acquired in some way for being then stored on digital media that can be accessed at the moment of checking.

The methodology described in EP1286315 hence introduces a marked limitation in the case of certification of a very large number of prints, in which case, in addition to the continuous modification of the process controls, which is necessary for each individual printed item, the storage of a large amount of data necessary for the subsequent checking phase becomes of fundamental importance, whether this storage is on local media or on remote media. At the right moment, said data must be retrieved and processed in order to make the comparison.

Said method consequently presents the drawback of rendering use of the system concretely impossible or in any way problematic in the case of lots of printed items with a wide circulation.

There is thus felt the need for a method for authentication and marking of printed products that is of a general-purpose type, that does not imply either modifications to the process of production and distribution of the goods to be associated to the printed item or modifications to the process that generates the printed item itself, and finally that does not require technological restrictions for the steps of authentication and verification.

PURPOSE OF THE INVENTION

The purpose of the present invention is to overcome the drawbacks of the solutions already known and propose a process and a system for antiforgery marking of printed products that will be applicable irrespective of the type of printing process and that will be of a passive type, i.e., that will not require modification of the apparatus for printing the product. At the same time, said system must enable analysis of authenticity without any limitation on the checking tools, through the use of generic optical-reading devices not correlated either with the printing process or with the technique of marking of the printed item.

SUMMARY OF THE INVENTION

The above purposes are achieved by providing a method according to the annexed claims.

The invention achieves the pre-set purpose by associating to the printed item to be authenticated an identification linked to information not easily reproducible and in relation to the "fingerprint" of the printer, which is extracted from the typical characteristics of the printing device used, which, since it is made up of electronic and mechanical (finite-precision) elements, possesses a unique and non-reproducible behaviour, leaving on each print a fingerprint of its own. By way of example, it may be said that the electromechanical elements of each individual printer as a whole induce a unique behaviour that can be characterized as a sort of fingerprint of the printer itself, i.e., as a microscopic "signature" that can be recognized and identified. Extraction of the aforesaid typical characteristics, like the verification step, can be performed by means of a process that comprises printing, acquisition, and finally processing of one or more images in digital format, referred to as "synthesis images". In greater detail, starting from an image in digital format—referred to in what follows as "master image"—a print of said image is made to obtain one or more prints, indicated with the term "guide prints". By means of purposely provided conversion devices, the guide prints are reconverted into digital format, to obtain synthesis images necessary for analysis of the behaviour and characterization of the "fingerprint" (or "digital signature"), summarized in an "identifier code" also containing information on the printed item. An identifier code indicates any representation of machine-readable information, i.e., information that can be read and interpreted by a computer.

Once the authentication process is through, a guide print will be present on the final product, obtained from the master image as described previously and the identifier code: the combination of the guide print and the identifier code defines the "identification marking".

In what follows, the expression "direct authentication" indicates the cases where the identifier code accompanies the guide print that is used to generate it.

The term "indirect authentication" indicates, instead, the cases where a number of guide prints concur in generating the identifier code: present on the final product will be the identification marking made up of the aforesaid code accompanied by new prints of the master image.

For details of the invention reference is made to the descriptive part of the system.

The presence of the fingerprint of the printer on the printed item is ensured by printing a master image (i.e., a physical guide print), combined with an identifier code of the product to be authenticated, which will be the printed item itself or a product associated thereto (for example, the contents of a packaging bearing a printed marking).

The advantages obtained basically consist in the fact that the process of authentication is simple and repeatable, at low cost, and does not require costly technologies or ones that are not easily available on the market. Moreover, also the verification of authenticity can be performed with optical-reading devices of a commercial type without any specific burdensome techniques or techniques tailored to the application.

A further advantage lies in the fact that no special materials (for example, inks or paper devised for the purpose) are used.

A further advantage lies in the fact that the technology proposed can readily be introduced into the process of distribution of the product in a simple way.

A further advantage lies in the fact that each printer, irrespective of the model or the user, leaves a characteristic trace on the printed item in the normal printing process, without any further interventions, and represents in itself a substantially unique signature of authenticity.

Yet a further advantage lies in the fact that, by certifying, not the physical print, but the characteristic of the printing process used, it is sufficient to employ a limited number of prints (for example, a few tens or hundreds of physical prints) in order to obtain the fingerprint that characterizes an entire lot of prints, which may even be very numerous. With the system according to the invention it is possible to authenticate a considerable number, even millions, of prints without having to check characterize all of them one by one.

LIST OF THE DRAWINGS

The above and further advantages will be better understood by any person skilled in the branch from the ensuing description and the annexed drawings, which are provided by way of non-limiting example and in which.

DETAILED DESCRIPTION

Figure 1:
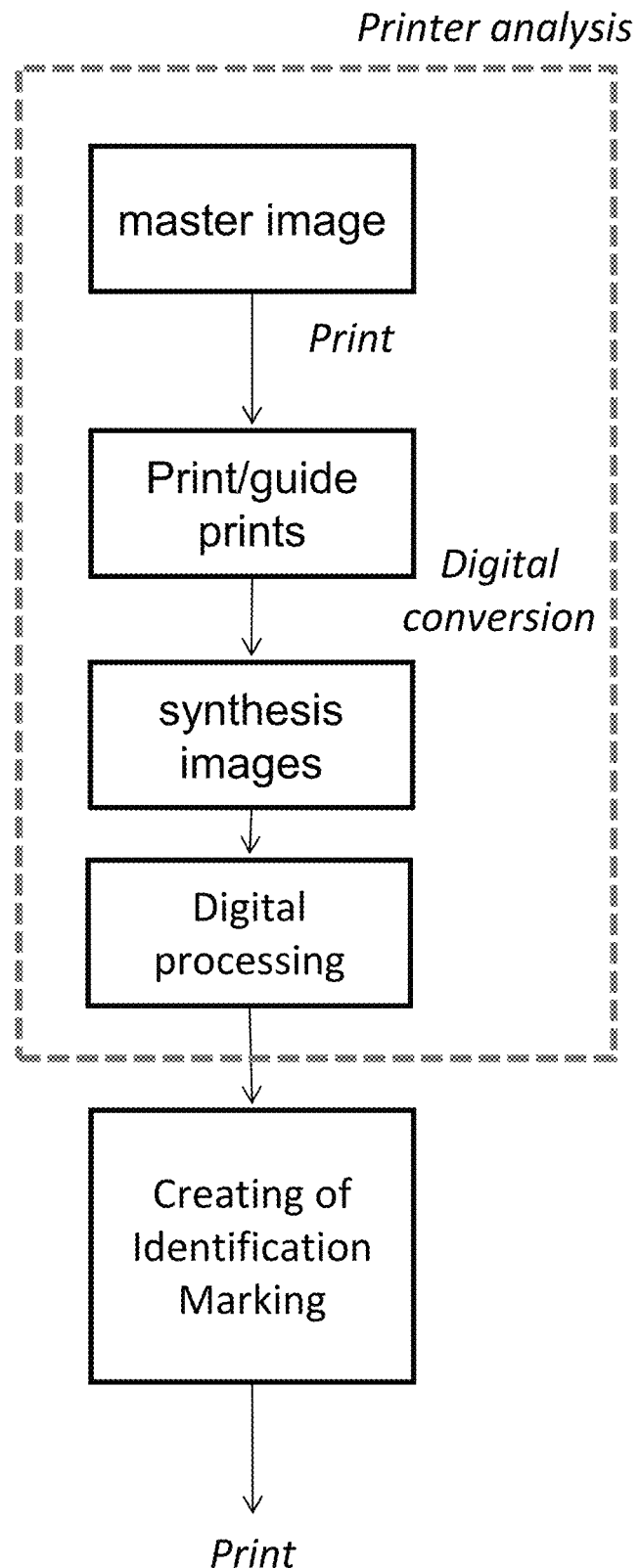
FIG. 1 is a schematic illustration of an example of embodiment of the method according to the invention.

A method according to the invention for antiforgery marking and verification of authenticity of printed products comprises the following steps:

- printing with a given original printer one (or more) physical guide prints starting from a master digital image;
- digitally acquiring said physical guide print (or prints), to obtain the synthesis digital image (or images);
- processing the synthesis digital image (or images) for extracting therefrom one or more intrinsic characteristics identifying the original printer;
- creating an identifier code by encoding the information associated to the product and to the characteristics identifying the original printer;
- in the case of direct authentication, incorporating in the printed product the identifier code, which, together with the guide print already present, comes to form the identification marking; and
- in the case of indirect authentication, affixing the identification marking, comprising the guide print and the identifier code, with the modalities described in what follows.

The method of verification of authenticity further comprises the following steps:

- digitally acquiring the printed product to be checked, which incorporates the identifier code and the guide print, to obtain a synthesis image;
- extracting the information contained in said identifier code;
- processing the synthesis image acquired (digitalized) for extracting therefrom one or more intrinsic characteristics identifying the original printer, as for the marking method; and
- verifying the consistency between the results of the processing of the image acquired and the information contained in the identifier code.

As regards the intrinsic characteristics of the printer, these depend upon the printing technology used (inkjet, offset, etc.), and from these, following upon processing, it is possible to extract the unique behaviour of the printer itself.

According to the printing technology, said characteristics, merely by way of example, may comprise:

- finite precision, vibrations, imperfections, and wear of the moving mechanical parts;
- alignment and precision of generation of screens (offset printing);
- dragging of the printing media (paper, card, etc.);
- alignment of the printing media;
- difference in absorption of the inks;
- porosity of the media, and the like.

These characteristics taken all together, in part, or together with others not mentioned, in combination with one another generate in the printed item a characteristic signature that does not depend upon the individual print but that is systematic; as such, even though said characteristics are not controllable nor eliminable, they can be mathematically modelled for generating a fingerprint identifying the printing process in a substantially unique way.

The invention moreover regards the printed products themselves, which are to be associated or affixed to the products that are to be protected against forgery, for example in the form of labels.

Advantageously, the guide print on the printed item intrinsically contains the characteristics identifying the printer, which are hidden from visual examination but can be detected by means of acquisition and subsequent digital processing until a digital signature of the printer is created.

Preferably, the method comprises a step of development and calibration of the process for authenticating printed items coming from a given printer.

With this solution, the digital signature extracted does not depend upon the conversion device (for example, single-channel or multiple-channel) used for producing the synthesis images.

Advantageously, the image used for extraction of the digital signature may be a selected area of the printed item that may also be acquired repeatedly, with increasing resolution, in order to reduce the disturbance introduced by digital conversion.

The selected area may moreover be defined in a step of calibration of the method to eliminate possible geometrical distortions introduced in the step of digital acquisition of the image, performed, for example, via a scanner or a CCD sensor like the ones present in some cellphones (for example, in the so-called "videophones").

In greater detail, and with reference to the attached drawings, a method according to the invention mainly comprises a step of extraction of the characteristics identifying the printer used to obtain a printed product of which it is possible to check the authenticity.

Figure 2:
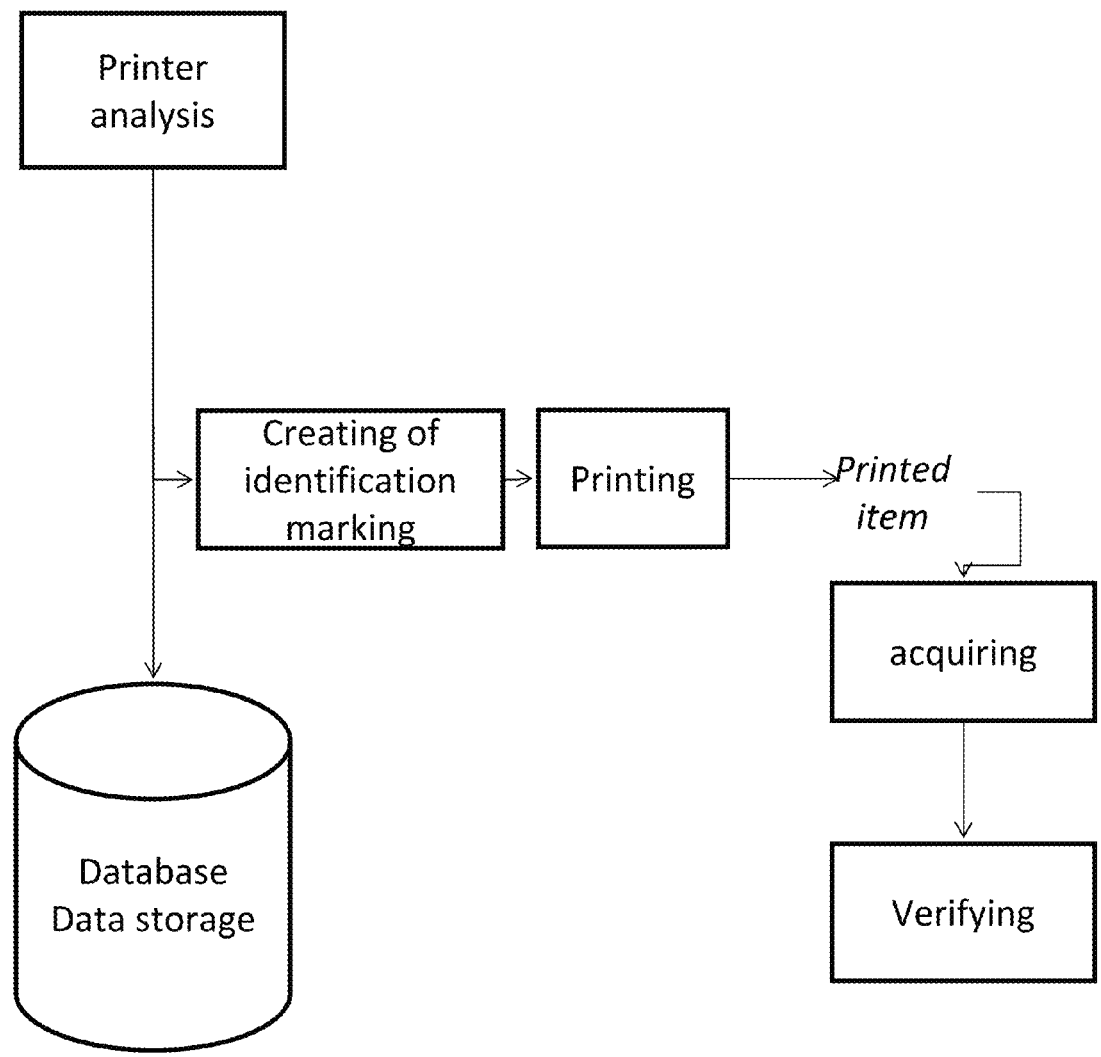
FIG. 2 is a schematic illustration of the method of authentication and verification.

FIG. 2 is a schematic representation of the main steps of an example of method for marking and checking a printed product according to the invention.

From a logistic and sequential standpoint, the steps can be listed schematically as follows:
1) generating one (or more) physical guide prints starting from the master image to undergo analysis, from which to extract the signature of the printer;
2) digitally acquiring the physical guide print (or prints) referred to in point 1 to obtain the synthesis digital image (or images);
3) analysing the digitized material (the synthesis image or images) and subsequently extracting an identifying digital signature;
4) creating an identification marking in relation to the digital signature;
5) applying, for example by printing, the identification marking on the product;
6) digitally acquiring the identification marking present on a printed product to be checked;
7) verifying authenticity of the identification marking present on the product.

Marking Function (Points 1-5 of the List)

With reference to point 1, starting from a digital source of the master image, the printer in question will produce one or more physical prints (guide prints), from which it is possible to acquire one or more digital images (synthesis images).

Figure 3:
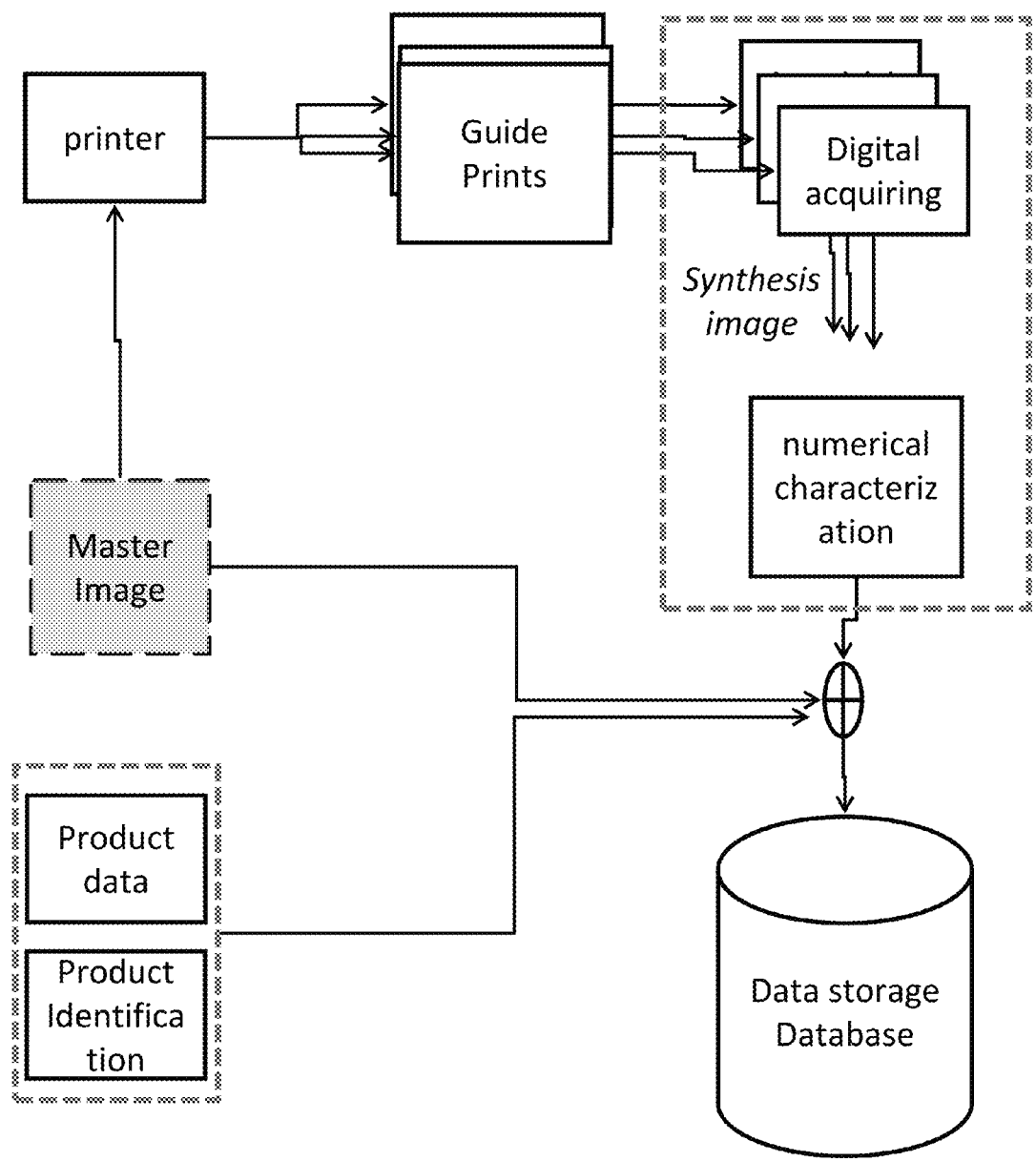
FIG. 3 shows the steps of analysis and storage of the signatures of authenticity and of the information of traceability.

FIG. 3 provides an example of application for multiple printed items (indirect authentication): the file containing the master digital image is printed on the printer to be analysed to produce a predefined number of guide prints. The prints are acquired digitally for producing again digital files to be analysed (synthesis images). Once analysis has been performed, the data can be stored in a database together with an identifier and together with many other data regarding the product.

Figure 4:
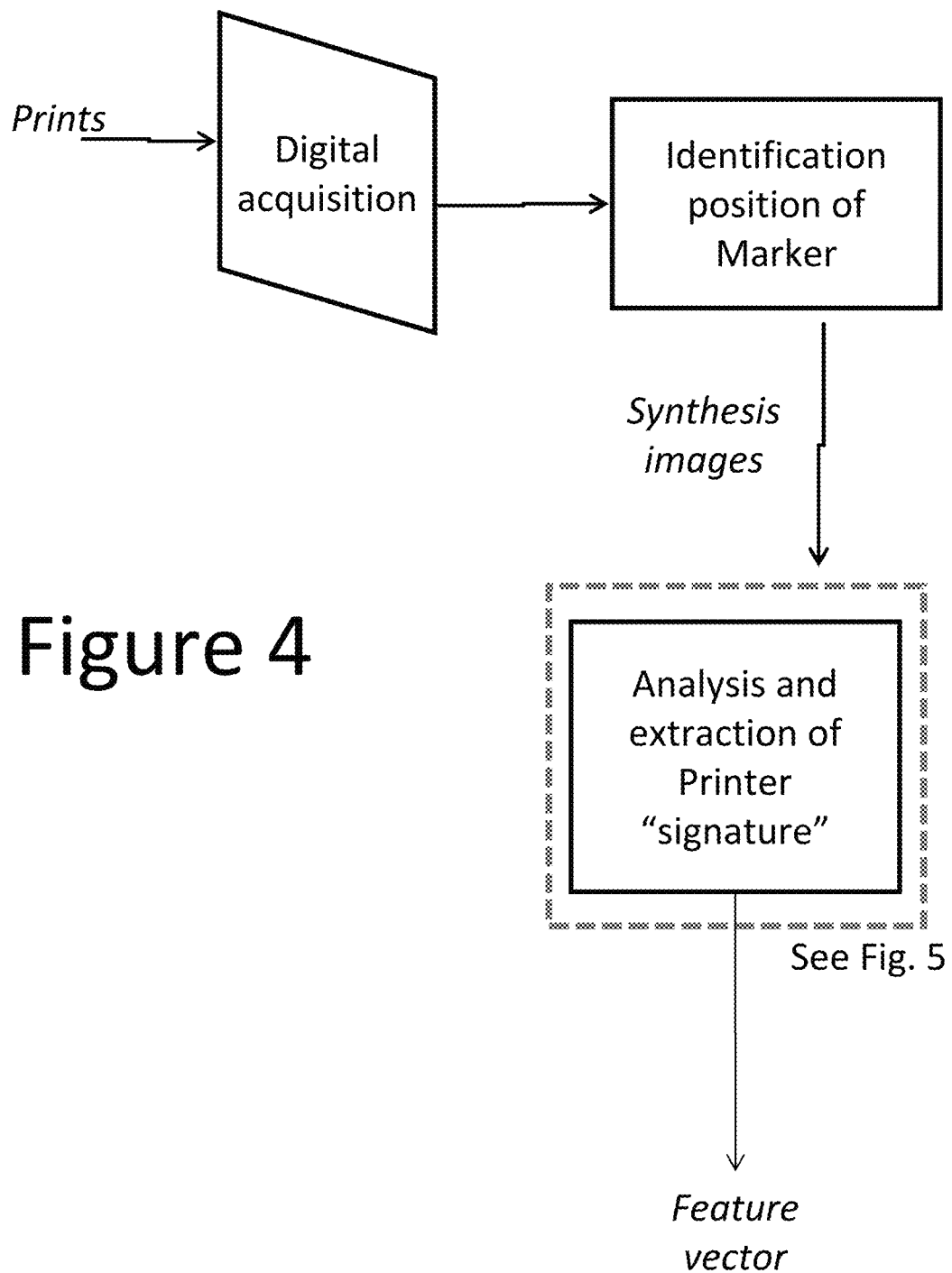
FIG. 4 shows in detail the step of extraction of the signature of authenticity in the steps of development and calibration of the method.

According to the invention, as indicated in FIG. 4, once the area of interest in the print has been identified, the corresponding digital image acquired (synthesis image) is processed for extraction of the digital signature of the printer to obtain a numerical characterization of the printer: by way of example, the digital signature may be formed by a linear or nonlinear combination (feature mixing) of a multiplicity of vectors (feature vectors) containing the characteristics identifying the printer and contained in the digital image processed.

Figure 5:
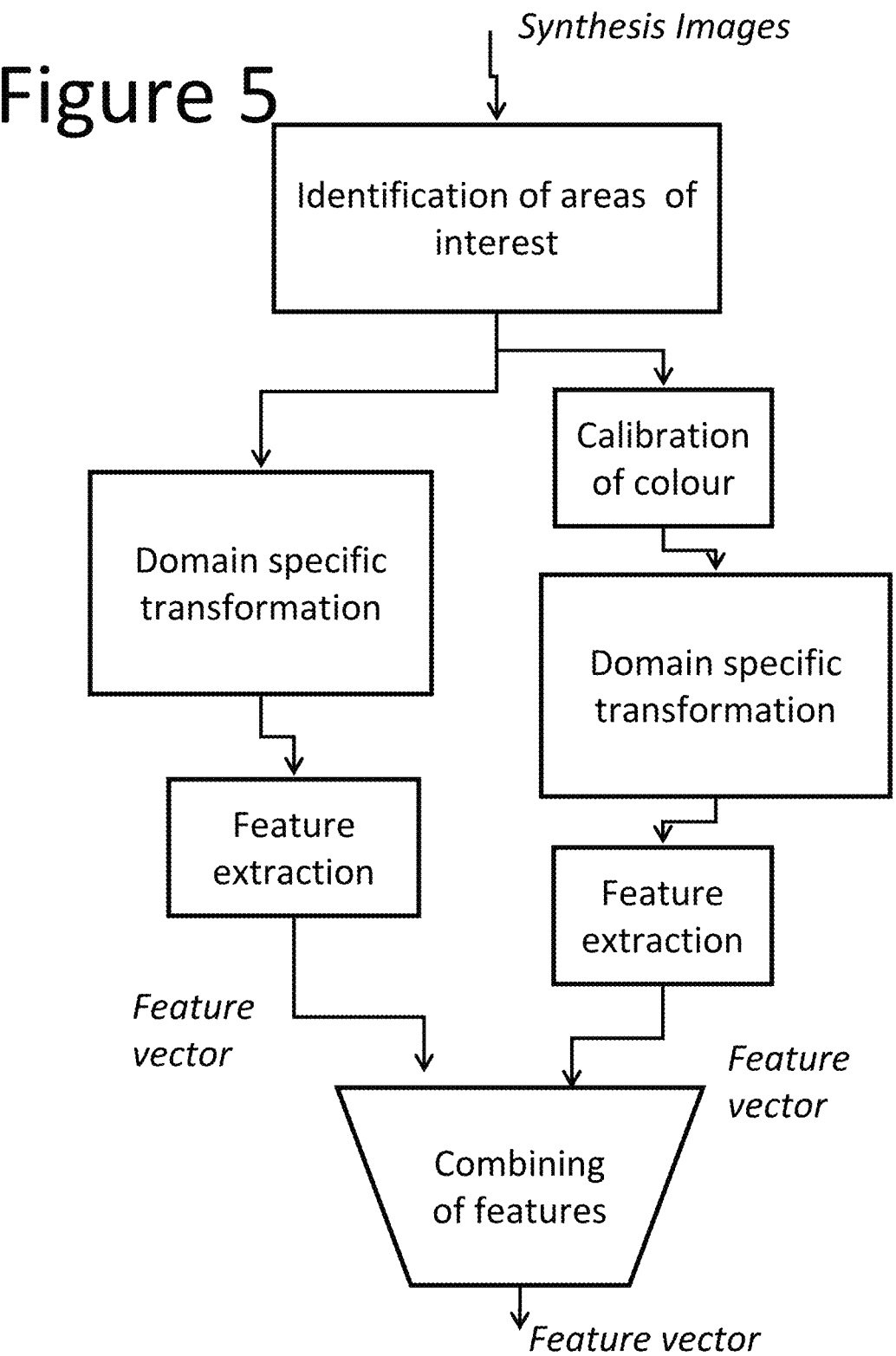
FIG. 5 shows in particular the step of extraction of the digital signature of the printed item.

FIG. 5 shows an explanatory but non-binding example of how it is possible to obtain a numerical characterization of the fingerprint of the printer.

As may be seen from the figure, from the aforesaid file there can be extracted characteristics of different nature, using different methodologies. As is known to persons skilled in the sector of digital processing of information, some intrinsic characteristics of the image are not strictly connected to the colour of the image, whereas many other are (for example, histograms). Consequently, in many cases it is necessary to make up for both the effect of the acquisition environment and the behaviour of the acquisition device, normalizing the colour to render analysis and verification as homogeneous as possible. The possibilities offered by the literature available on image-processing techniques are extremely vast, and hence equally numerous are the paths that can be explored for designing a system that will be able to characterize the behaviour of the printer: very effective in the description of the information content of an image are the techniques in the transform domain (Fourier transforms, wavelet transforms, Radon transforms, etc.), as likewise many statistical-approach techniques are of excellent application (local distributions, integral distributions, windowed distributions, etc.) and techniques based upon shape and texture descriptors (random field, etc.). Each of these techniques (provided merely by way of example) can furnish a specific and adequate numerical description of the signature: hence the combined use of one or more techniques in the system produces a set of numerical values (referred to in FIG. 5 as "feature vectors") that can first be selected on the basis of their capacity of description of the signature and then used in the verification step as term of comparison.

Figure 6:
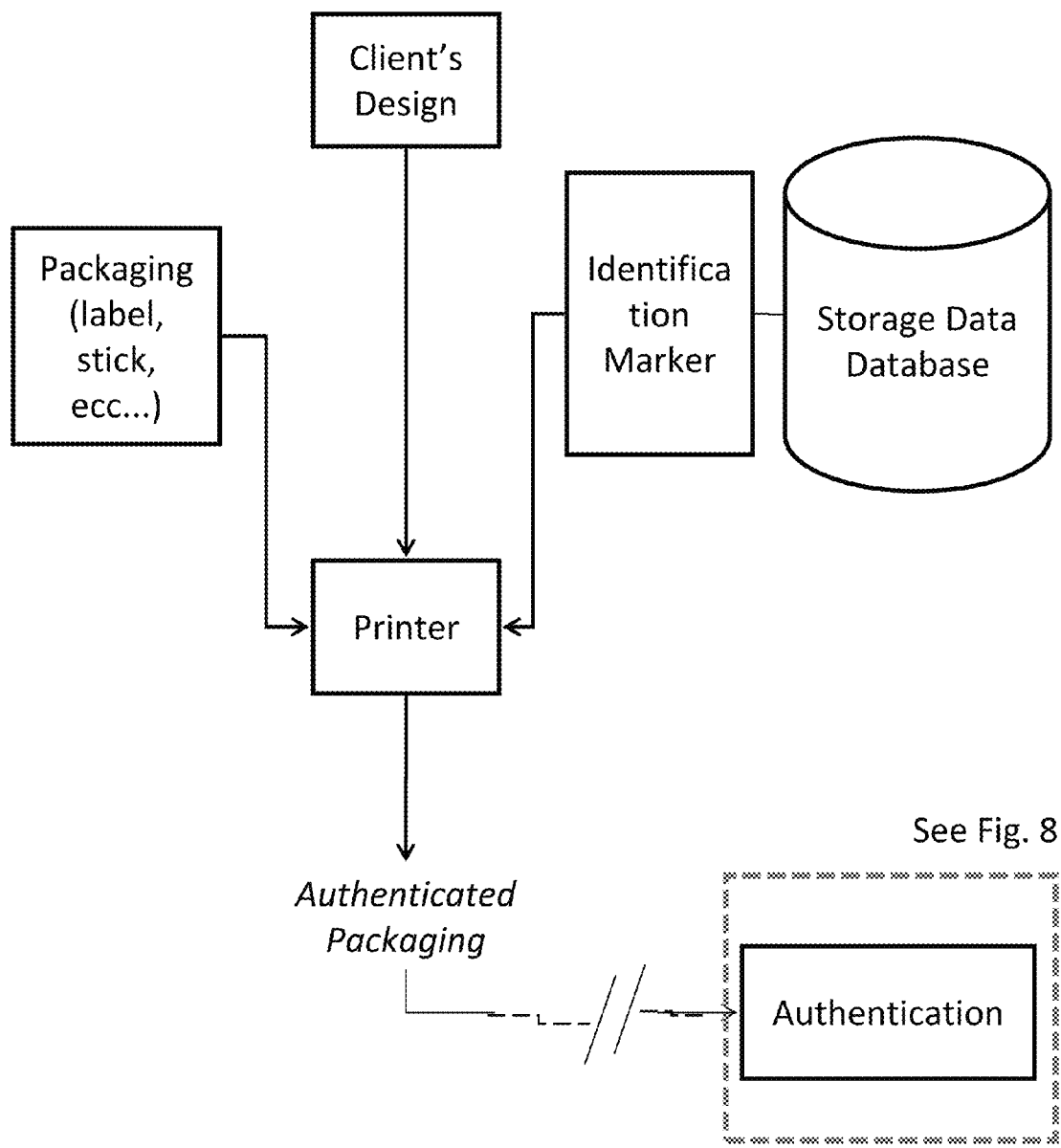
FIG. 6 is a schematic illustration of the method for printing a packaging in the case of indirect marking for multiple applications.

Once the numerical description has been obtained, there may moreover be entered in a database (DB) not only said numerical description but also the data regarding the identifier codes of the printed item and its traceability (FIGS. 3 and 6) as also other information, such as for example web connections to pages describing the product or information on the commercial characteristics of a product associated to the printed item, for example a drug.

Preferably, the database (DB) contains the description of the digital signature obtained, information regarding the traceability of the printed item, information regarding the identity of the printed item, etc.

On the basis of the method just described, there can thus be created a marking in protected and encrypted mode (for example, an identifier code that can be interpreted by a computer, such as a QR or the like) that associates the digital signature regarding the information of identification of the printed item and possible information regarding the product associated to the printed item.

The identifier code created can finally appear on the printed item, together with the guide print obtained starting from the master digital image, with which it will form the identification marking, applied as authentication of a product associated thereto, for example a packaging or a label.

Preferably, the guide print and the identifier code can be reproduced on the printed item at the same time or following upon the image of the printed item (designated by "Client Design" in so far as it responds to the needs of the client or is even created by the client; for example, the label of a product, such as wine or the like) and can be in positions adjacent to one another or in different points of the printed item itself.

In a first example (represented schematically in FIG. 6), the identifier code and the image printed can be combined in one and the same digital file to be used for physical printing of the printed item. Said digital medium may thus better integrate with the possible graphics of the packaging or of the label or of the sticker and may be sent to the same printing process with which the identifier code is calibrated to produced the authentic physical printed items without the need to proceed to individual calibrations that depend upon the specific print.

This modality is advantageous for authenticating industrial products on a large scale as labellings for wines, drugs, packaging, etc.

It is moreover possible, in particular in the case mass-produced products, to print stickers to be applied to the products subsequently.

Figure 7:
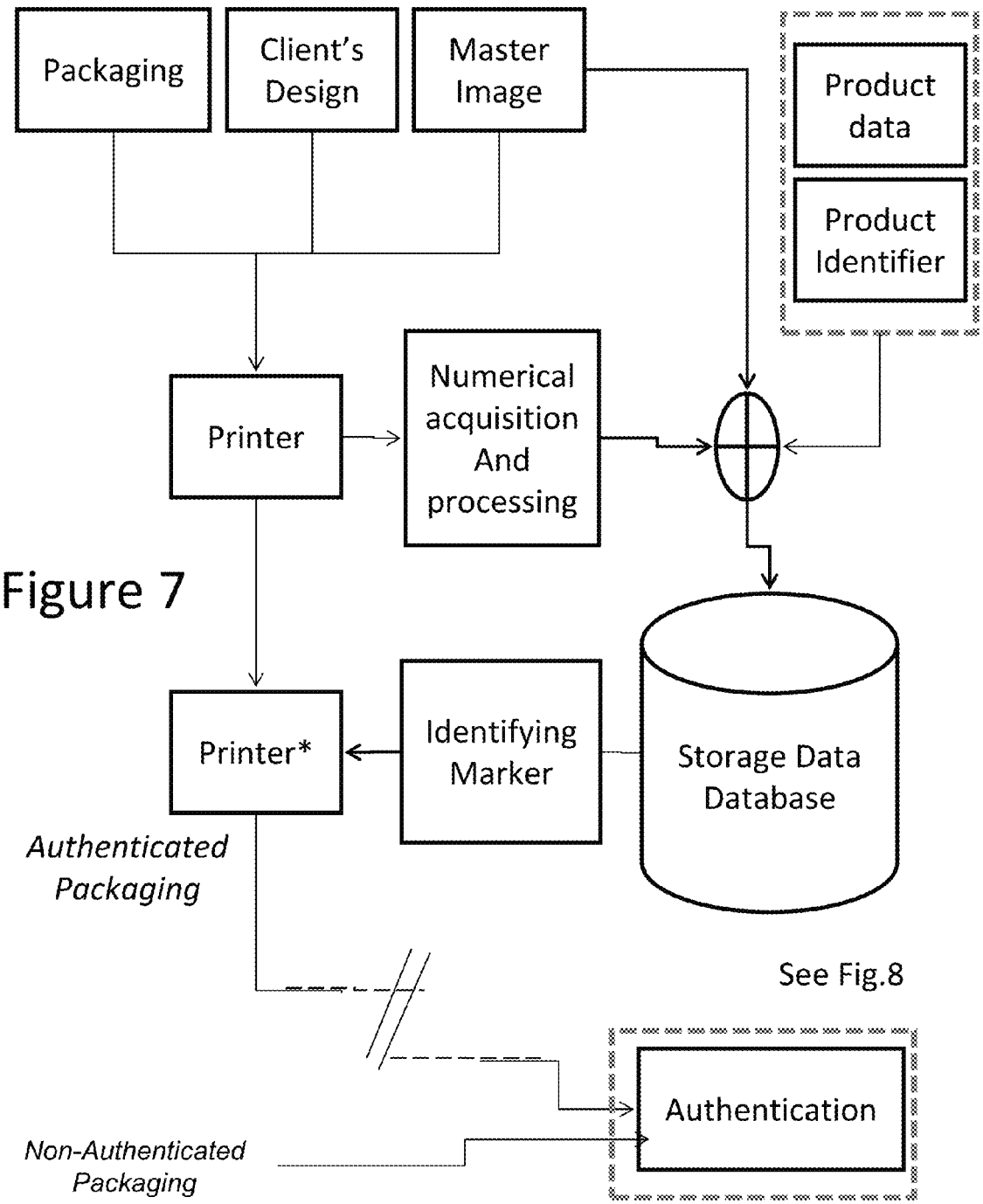
FIG. 7 is a schematic illustration of the method in the case of application to a single printed item, in the case of direct marking for individual applications.

However, there may also be envisaged the possibility of individual authentication, referred to as "direct authentication". This modality is very useful—by way of example—in the case of certificates: in this case, the identifier code is applied subsequently, even by a printer that is not the one analysed: this example is represented schematically in FIG. 7, where there may be noted the use of the asterisk for differentiating between two different printers: in fact, the identifier code can be applied after the "Client Design" image, and in this case it is not required, but nor is it ruled out, that the printer is the one analysed.

This modality is advantageous in the case of a limited or non-determinable number of applications.

A more specific calibration can thus be determined in order to prevent the same printing process from possibly being used for producing authentic prints that are not authorized. This modality is advantageous for authenticating individual products, such as certificates, contracts, and documentation printed on demand.

Verification Function (Points 6-7 of the List)

Figure 8:
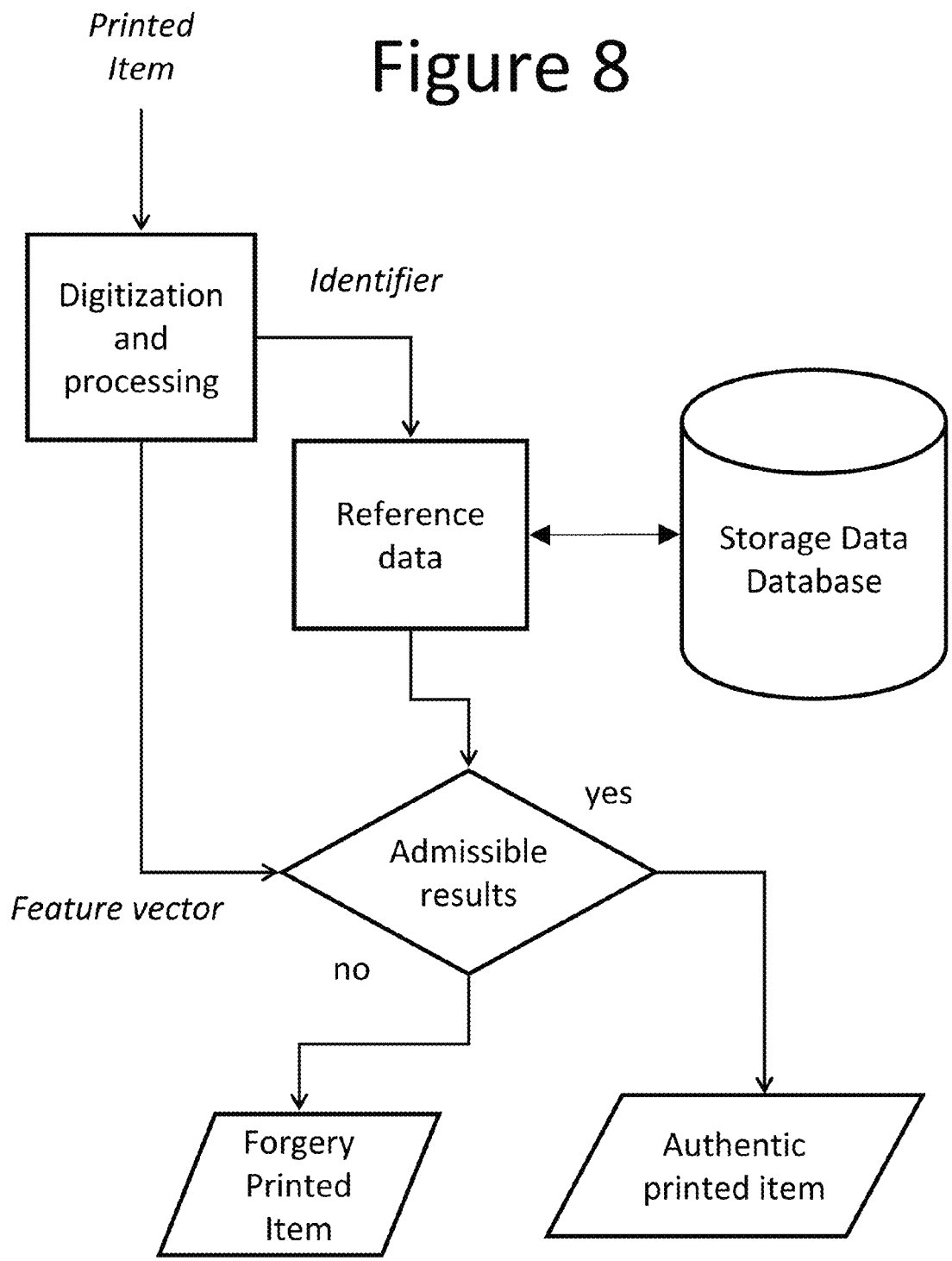
FIG. 8 is a schematic illustration of the step of authentication according to the method.

According to the invention, the authentication method just described can envisage a verification of authenticity, whereby it is possible to ascertain the originality of a printed item or, otherwise, its forged nature. The process of verification, represented schematically in FIG. 8, preferably comprises the following steps:
1. digitally acquiring the guide print present on a printed item to be checked, with consequent creation of the synthesis image;
2. extracting the information contained in the identifier code appearing on the printed item;
3. extracting the characteristics identifying the printer by processing the synthesis image—acquired from the printed item with the predefined processing method;
4. verification of the consistency or otherwise of said information between the printed item and the characteristics identifying the printer.

Preferably, the information of association "Reference data" can be obtained from a further identifier code of the printer contained in the main identifier code and associated to an external database (accessible, for example, via web).

In a second case, which does not envisage remote access on line, the information of association is stored in the main identifier code itself.

Likewise, the method of extraction of the digital signature to be compared can be carried out remotely on a web server, or else carried out locally if a remote line is not available.

Figure 9:
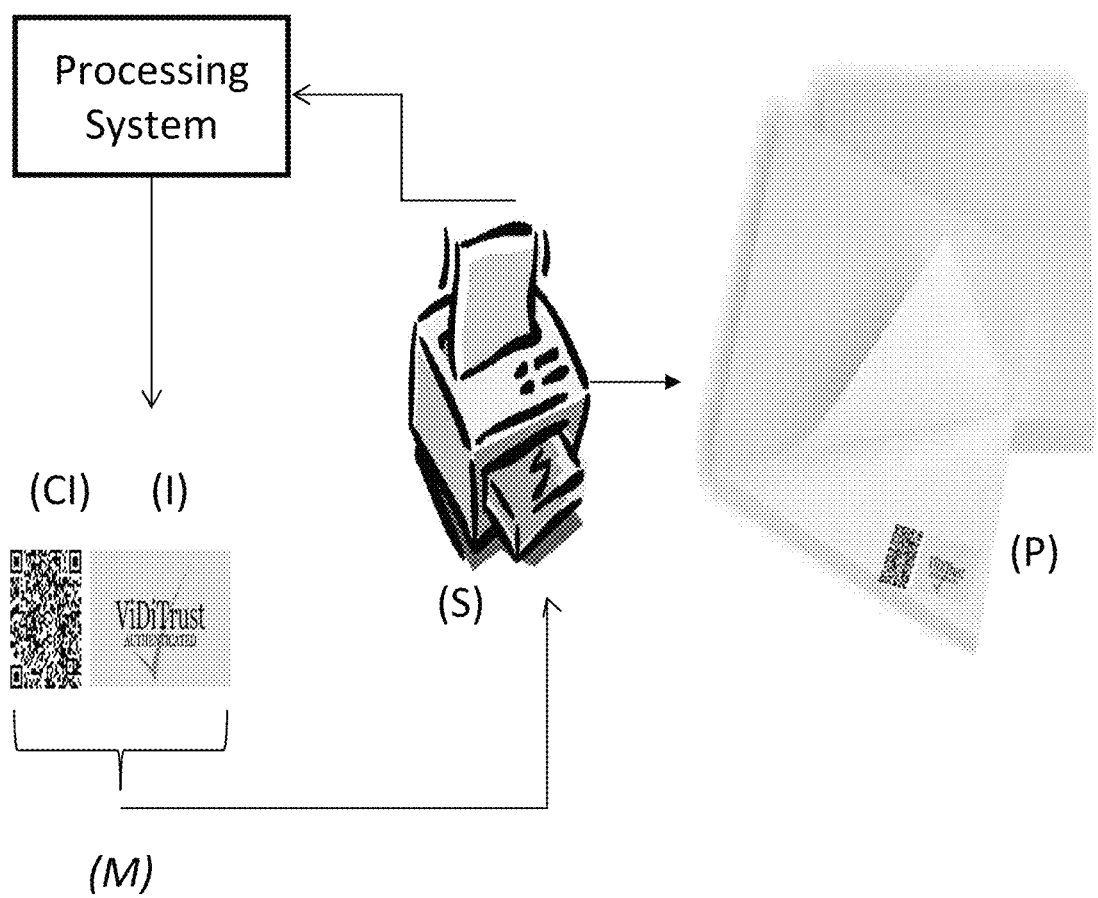
FIG. 9 is a schematic illustration of an application of the authentication method.

Illustrated schematically in FIG. 9 is the application of the method of the invention to printed products P (for example sheets, packaging) that are to be printed with a given original printer S.

With the method, a synthesis image obtained from a guide print produced by the printer S is processed by a processing system that implements the method and extracts from the synthesis image one or more intrinsic characteristics identifying the printer used and information associated to the printed product and to the characteristics identifying the printer, for example in numerical form, which can be synthesised in a machine-readable code, for example a barcode or matrix code.

The identifier code CI and the master image I that will have to be printed by means of the printer S constitute a marking M that will then be applied to the products P.

Advantageously, whereas the synthesis image used for extraction of the digital signature of the printer must necessarily be printed using the printer in question, to enable verification of authenticity thereof as described above the code CI may also be applied to the products P in some other way, at different times and also with different printers.

The present invention has been described according to preferred embodiments, but equivalent variants thereof may be devised, without departing from the sphere of protection of the invention.

The invention claimed is:
1. A method for antiforgery marking of lots of printed products (P) that are to be printed with a given single original printer (S), comprising the following steps:
  printing with said single original printer one or more physical guide prints of a master digital image that form part of a lot of printed products;
  digitally acquiring said one or more guide prints to obtain one or more synthesis digital images;
  processing said one or more synthesis images to extract therefrom one or more intrinsic characteristics uniquely identifying the single original printer;
  creating at least one identifier code (CI) by encoding information associated to the product and information associated to the characteristics uniquely identifying the single original printer;
  creating an identification marking (M) of the product (P) comprising said identifier code in combination with said one or more guide prints already present on the product; and
  applying said marking (M) to the products (P) of said lot,
  wherein said processing of the synthesis image comprises a numerical characterization of the synthesis image capable of obtaining a digital signature uniquely identifying the single original printer, said numerical characterization being performed using one or more image-processing techniques selected from among transformed-domain processing techniques, statistical-approach techniques, techniques based upon shape and texture descriptors, techniques based upon multi-channel analysis of the acquisition channels, or combinations thereof.

2. The method according to claim 1, wherein the step of applying said identifier code to said product (P) comprises the combination of said identifier code and said one or more guide prints in one and the same digital file to be used as origin for the physical printing of the product.

3. The method according to claim 1, wherein said identifier code is applied to said product (P) after obtaining said guide print.

4. The method according to claim 1, wherein said identification marking comprises information regarding the traceability of the printed product (P).

5. The method according to claim 1, comprising a step of storing in a database information regarding the characteristics uniquely identifying the single original printer and regarding the information on traceability of the printed product.

6. The method according to claim 1, further comprising the following steps of verification of the authenticity of a printed product bearing a marking (M):
   digital acquisition of the printed product to be verified, which incorporates the identifier code and the guide print, to obtain one or more synthesis images;
   extraction of the information contained in the identifier code;
   processing of said one or more synthesis images for extracting therefrom information associated to said one or more intrinsic characteristics uniquely identifying the single original printer; and
   verification of the consistency between the information extracted in the step of processing of the synthesis image and the information contained in the identifier code.

7. The method according to claim 6, wherein said information of association is obtained from a further identifier code of the single original printer, which is contained in said identification marking and can be referred to an external database accessible on line.

8. The method according to claim 6, wherein said information of association is in the identification marking itself.

9. The method according to claim 6, wherein said extraction of the information associated to identifying characteristics is performed on line via a remote server.

10. The method according to claim 6, wherein said extraction of the information associated to identifying characteristics is performed locally.

11. A non-transient computer-readable medium containing a computer program for implementing the method according to claim 1.

12. A system for antiforgery marking of printed products (P) that are to be printed with a given single original printer (S), comprising:
   means for digitally acquiring a physical guide print printed starting from a master image with said single original printer and for obtaining a synthesis image;
   means for processing, using the program according to claim 11, the synthesis image acquired and extracting therefrom one or more intrinsic characteristics uniquely identifying the single original printer (S); and
   means for incorporating in the printed product (P) an identification marking (M) containing an identifier code (CI) associated to the product (P) and the intrinsic characteristics uniquely identifying the single original printer (S), and a guide print obtained using said single original printer.

* * * * *